United States Patent
Kim et al.

(10) Patent No.: US 10,631,275 B2
(45) Date of Patent: Apr. 21, 2020

(54) METHOD AND DEVICE FOR PERFORMING COMMUNICATION WITH VIRTUAL TERMINAL IN WIRELESS COMMUNICATION SYSTEM

(71) Applicant: LG ELECTRONICS INC., Seoul (KR)

(72) Inventors: Heejin Kim, Seoul (KR); Jiwon Kang, Seoul (KR); Kilbom Lee, Seoul (KR); Kitae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/758,332

(22) PCT Filed: Sep. 9, 2016

(86) PCT No.: PCT/KR2016/010181
§ 371 (c)(1),
(2) Date: Mar. 7, 2018

(87) PCT Pub. No.: WO2017/043921
PCT Pub. Date: Mar. 16, 2017

(65) Prior Publication Data
US 2018/0263025 A1    Sep. 13, 2018

Related U.S. Application Data

(60) Provisional application No. 62/217,006, filed on Sep. 10, 2015.

(51) Int. Cl.
*H04W 72/04* (2009.01)
*H04W 84/00* (2009.01)
(Continued)

(52) U.S. Cl.
CPC ........ *H04W 72/0406* (2013.01); *H04B 7/022* (2013.01); *H04B 7/0404* (2013.01);
(Continued)

(58) Field of Classification Search
None
See application file for complete search history.

(56) References Cited

U.S. PATENT DOCUMENTS

2005/0136932 A1* 6/2005 Nagai .................. H04B 7/0408
455/450
2005/0181831 A1* 8/2005 Doi ........................ H01Q 1/246
455/562.1
(Continued)

FOREIGN PATENT DOCUMENTS

WO    2015004186    1/2015

OTHER PUBLICATIONS

PCT International Application No. PCT/KR2016/010181, Written Opinion of the International Searching Authority dated Dec. 16, 2016, 4 pages.

*Primary Examiner* — Mazda Sabouri
(74) *Attorney, Agent, or Firm* — Lee, Hong, Degerman, Kang & Waimey

(57) ABSTRACT

Provided is a method and device for performing communication with a virtual terminal in a wireless communication system. A base station determines a second plurality of virtual terminals, to which downlink data is to be transmitted, among a first plurality of virtual terminals constituting an actual terminal, transmits control information for transmitting the downlink data to at least one virtual terminal of the second plurality of virtual terminals, and transmits the downlink data to the second plurality of terminals. The actual terminal may be a vehicle terminal, and each of the first plurality of virtual terminals may comprise at least one
(Continued)

of a plurality of distributed antenna arrays installed in the vehicle terminal.

10 Claims, 12 Drawing Sheets

(51) Int. Cl.
| | |
|---|---|
| *H04B 7/0404* | (2017.01) |
| *H04B 7/022* | (2017.01) |
| *H04B 7/06* | (2006.01) |
| *H04W 4/40* | (2018.01) |
| *H04W 72/12* | (2009.01) |
| *H04W 4/44* | (2018.01) |
| *H04W 88/06* | (2009.01) |
| *H04B 7/00* | (2006.01) |
| *H04W 88/02* | (2009.01) |

(52) U.S. Cl.
CPC ............ *H04B 7/0617* (2013.01); *H04W 4/40* (2018.02); *H04W 72/121* (2013.01); *H04W 72/1273* (2013.01); *H04W 84/00* (2013.01); *H04B 7/00* (2013.01); *H04W 4/44* (2018.02); *H04W 84/005* (2013.01); *H04W 88/02* (2013.01); *H04W 88/06* (2013.01)

(56) References Cited

U.S. PATENT DOCUMENTS

| | | | |
|---|---|---|---|
| 2006/0229804 A1 | 10/2006 | Schmidt et al. | |
| 2008/0051037 A1* | 2/2008 | Molnar ................ | H04B 7/0632 455/70 |
| 2012/0147831 A1* | 6/2012 | Golitschek ............ | H04L 1/0026 370/329 |
| 2013/0010709 A1* | 1/2013 | Earnshaw ............... | H04L 5/001 370/329 |
| 2013/0286960 A1 | 10/2013 | Li et al. | |
| 2014/0211873 A1* | 7/2014 | Park ..................... | H04B 7/0617 375/267 |
| 2014/0302774 A1 | 10/2014 | Burke et al. | |
| 2014/0328241 A1 | 11/2014 | Subramanian et al. | |
| 2014/0348260 A1* | 11/2014 | Lorca Hernando .. | H04B 7/0617 375/295 |
| 2016/0192388 A1* | 6/2016 | Ekpenyong ....... | H04W 72/1284 370/329 |

* cited by examiner

METHOD AND DEVICE FOR PERFORMING COMMUNICATION WITH VIRTUAL TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2016/010181, filed on Sep. 9, 2016, which claims the benefit of U.S. Provisional Application No. 62/217,006, filed on Sep. 10, 2015, the contents of which are all hereby incorporated by reference herein in its entirety.

BACKGROUND OF THE INVENTION

Field of the Invention

The present invention relates to wireless communication and, more particularly, to a method and a device for performing communication with a virtual terminal in a wireless communication system.

Related Art

In the current mobile communication system, services for individual users occupy most of the traffic, and the movement speed of a user is inversely proportional to the required data rate and quality of service (QoS). Accordingly, in the current mobile communication system, a user who is at a stop position or moves at a low speed may enjoy a high-quality service at a high data rate and with guaranteed QoS while a user moving at a high speed may receive a service at a low data rate and with low QoS but reliably without a link failure. However, as the frequency of using wireless communication is increased and service categories relying on wireless communication are extended, there is a growing need to ensure a high data rate and QoS even for the users moving at a high speed. Examples of the aforementioned situation may include a case in which a large number of passengers using public transportation want to watch a video or a plurality of users in a personal vehicle driving on the highway want to use different wireless communication services. In order to satisfy the needs, the current mobile communication system may have to be improved dramatically, or a new system may have to be designed, which is capable of supporting the aforementioned needs without making an influence on the current network.

For the purpose of supporting a high data rate and high QoS for the user moving at a high speed, an antenna array system for vehicular communication, which installs a large antenna array on the vehicle, is drawing attention to the public. This kind of antenna array system is also called a vehicular multiple-input multiple-output (MIMO) system. By installing a large antenna array in a vehicle, high quality services may be provided while the vehicle is moving at a high speed through the array gain. When a large antenna array is installed in a vehicle and wireless communication is conducted between a base station and a user in the vehicle, the following advantages may be obtained.

(1) Performance degradation due to penetration loss at the average of 20 dB may be prevented.

(2) Since a large number of reception antennas are used compared with the number of users in a vehicle, an array gain may be ensured.

(3) Since the spacing between reception antennas is readily guaranteed, reception diversity is obtained easily.

By installing a large antenna array for vehicular communication as described above, users may still enjoy excellent communication services even in the current mobile communication system without significant improvement of the network. However, despite the apparent advantages, it is not easy to find actual examples of installing a large antenna array in a vehicle. One of the reasons for the low acceptance of a large antenna array is that since a vehicle itself is an expensive commodity, users are reluctant to modify their vehicle. Also, since a vehicle is such kind of apparatus that demands various requirements in terms of design and aerodynamic structure in addition to communication performance, it is not easy to install a large antenna array which restricts vehicle design in the aesthetic or aerodynamic point of view.

Therefore, vehicle makers use only the combination antenna type (for example, shark antenna) which provides inferior performance to the single antenna type. Therefore, a more effective method for installing a large antenna array is needed, and furthermore, a method for a user in a vehicle to communicate in an efficient manner with a base station through an installed antenna array is required.

SUMMARY OF THE INVENTION

The present invention provides a method and an apparatus for performing communication with a virtual terminal in a wireless communication system. The present invention proposes a virtual user-based communication method for supporting a high quality communication service for a mobile communication device within a vehicle required to support high performance compared to other devices and less constrained for hardware configuration. The present invention provides a procedure for registering a virtual terminal to a base station and a method for controlling reception of a plurality of virtual terminals registered in a single device.

In an aspect, a method for performing communication with a virtual terminal by an eNodeB (eNB) in a wireless communication system is provided. The method includes determining a second plurality of virtual terminals, to which downlink data is to be transmitted, among a first plurality of virtual terminals constituting an actual terminal, transmitting control information for transmission of the downlink data to at least one virtual terminal among the second plurality of virtual terminals, and transmitting the downlink data to the second plurality of virtual terminals.

In another aspect, an eNodeB (eNB) in a wireless communication system is provided. The eNB includes a transceiver, and a processor, connected to the transceiver, that determines a second plurality of virtual terminals, to which downlink data is to be transmitted, among a first plurality of virtual terminals constituting an actual terminal, controls the transceiver to transmit control information for transmission of the downlink data to at least one virtual terminal among the second plurality of virtual terminals, and controls the transceiver to transmit the downlink data to the second plurality of virtual terminals.

Through a plurality of distributed antenna arrays installed in a vehicle, a base station and a user in the vehicle can communication efficiently from each other.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
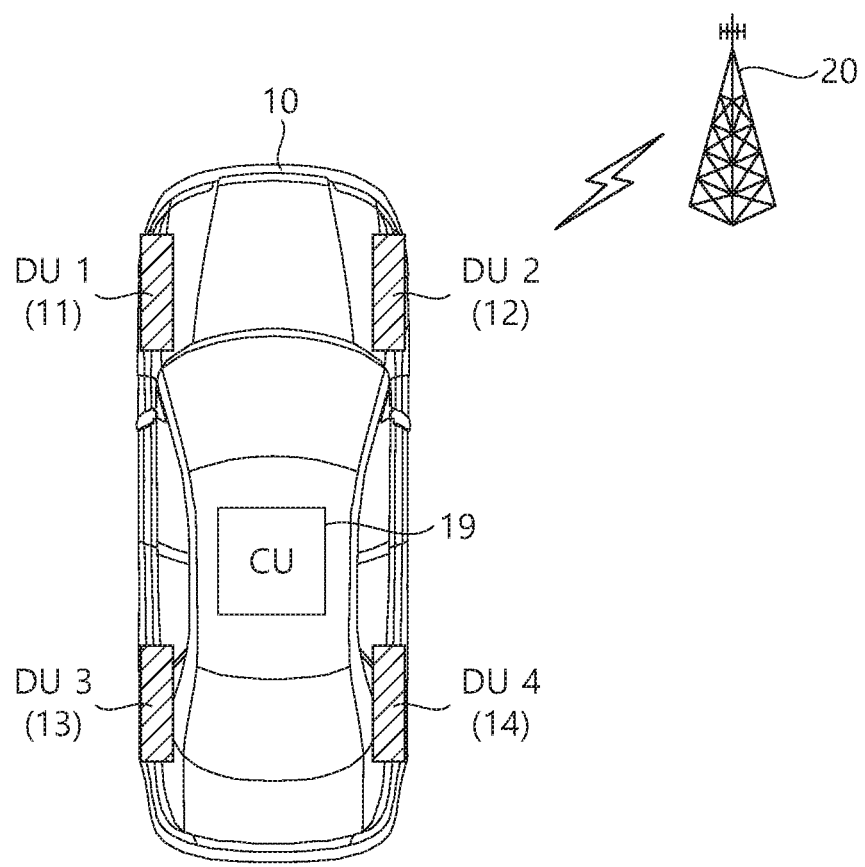
FIG. 1 is one example of a wireless communication system according to one embodiment of the present invention.

FIG. 1 is one example of a wireless communication system according to one embodiment of the present invention. The wireless communication system of FIG. 1 consists of a vehicle equipped with a distributed antenna array and an eNodeB (eNB). To overcome the spatial constraint laid by a large antenna array, the distributed antenna array implements a large antenna array system through a plurality of arrays instead of using a single array. The distributed antenna array includes a plurality of distributed units (DUs) and one or more central units (CUs). One DU may include at least one antenna. A plurality of DUs have various shapes and radiation patterns according to their installation positions and being distributed across the vehicle, communicate directly with the eNB. A CU controls transmission and reception of signals and data through a plurality of DUs in an integrated manner and relays signals and data transmitted and received to and from a plurality of DUs to the user in the vehicle. Referring to FIG. 1, the distributed antenna array consists of four DUs 11, 12, 13, 14 and one CU 19. By communicating with the eNB through a distributed antenna array in a vehicle, reception diversity gain through employment of an antenna array may be maximized. Also, in a high speed mobile communication scenario in which a communication condition may change abruptly, the situation of losing a radio connection between the eNB and the vehicle may be prevented through cooperative reception among DUs having different radiation patterns.

Figure 2:
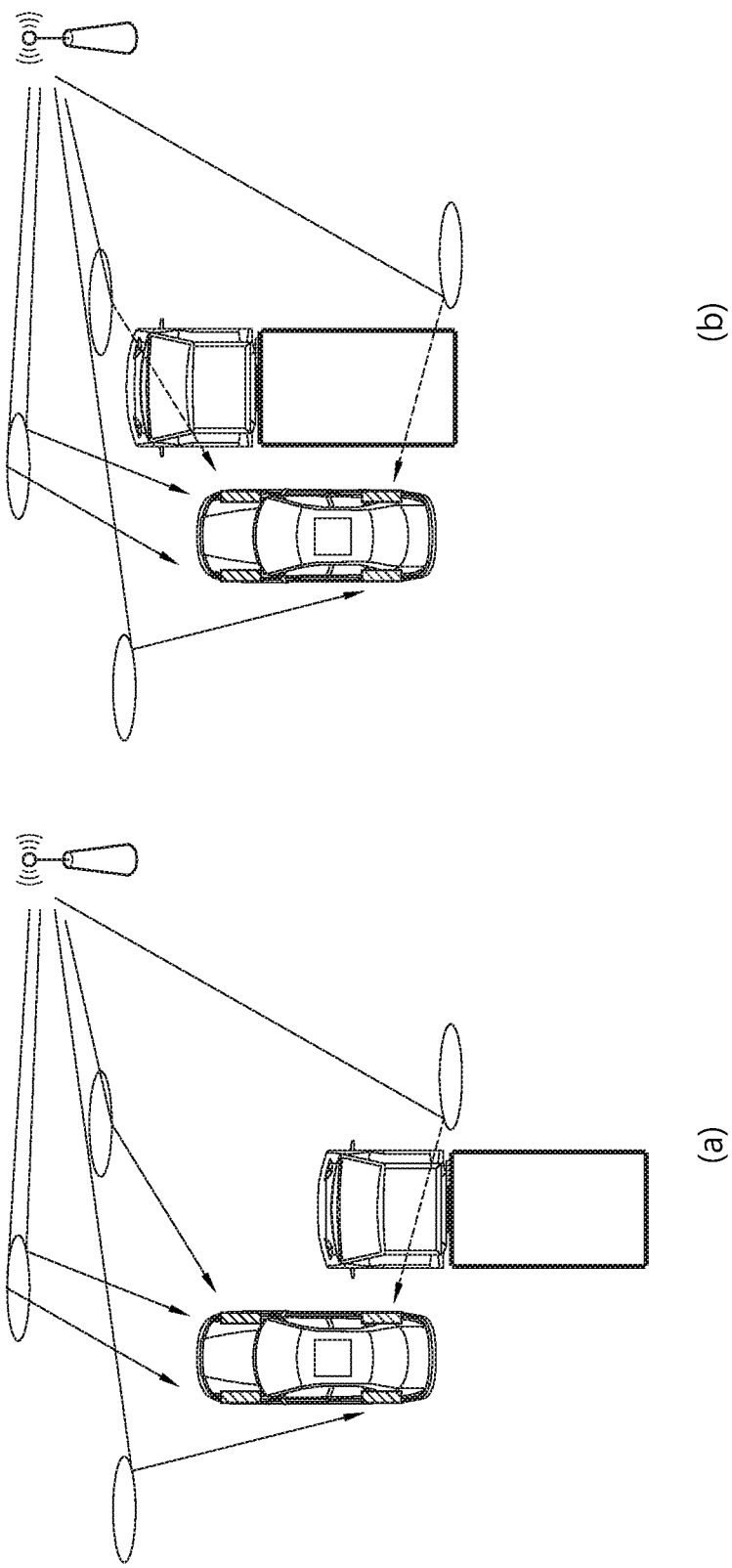
FIG. 2 illustrates one example of an advantage of using an installed distributed antenna array.

FIG. 2 illustrates one example of an advantage of using an installed distributed antenna array. FIG. 2(a) illustrates a situation in which there is no obstacle between a vehicle equipped with a distributed antenna array and the eNB. FIG. 2(b) illustrates a situation in which a truck is located as an obstacle between the vehicle equipped with a distributed antenna array and the eNB. However, through various DUs constituting the distributed antenna array, the eNB and the vehicle may still be able to communicate with each other. In this respect, even if there is an obstacle in the path between the eNB and the vehicle, a distributed antenna array is more appropriate for preventing a link failure compared with existing systems.

As described above, by employing a large antenna array, a distributed antenna array becomes able to reinforce gain of received power and support high data rate and at the same time, becomes more robust to degradation of communication performance and link failure that may be caused by path disturbance. In this respect, the distributed antenna array is regarded as an antenna array technology very suitable for vehicular mobile communication.

However, to exploit the distributed antenna array, lossless cables have to be used between a CU and a DU. When each distributed DU or sub-array antenna performs the role of forwarding an RF signal to a CU, a high-frequency cable has to be used between the DU and CU for sharing the RF signal. However, a high-frequency cable is expensive and sensitive to physical disturbances such as movement and external impact. Also, when a failure occurs in the receiving end, it is very difficult to recover from the failure. To solve the problem above, a modem may be installed, which operates independently of each DU or sub-array antenna, or after part of a reception operation is performed independently by each DU or sub-array antenna, the DU or sub-array antenna may share a baseband signal or digitally processed signal with the CU.

Also, in order for a distributed antenna array to obtain an actual gain in the current mobile communication system, an access control method suitable for the distributed antenna array has to be adopted. Current access control methods are primarily targeted to terminals employing a single antenna array. The methods are based on the reception power-based access control scheme which compares received power of a reference signal for cell search transmitted from each eNB and selects an eNB most suitable for providing a service to each terminal. According to the reception power-based access control scheme, path diversity effective for preventing degradation of communication performance due to path disturbance is not attainable, and moreover, it is difficult to compare reception diversity gain.

Figure 3:
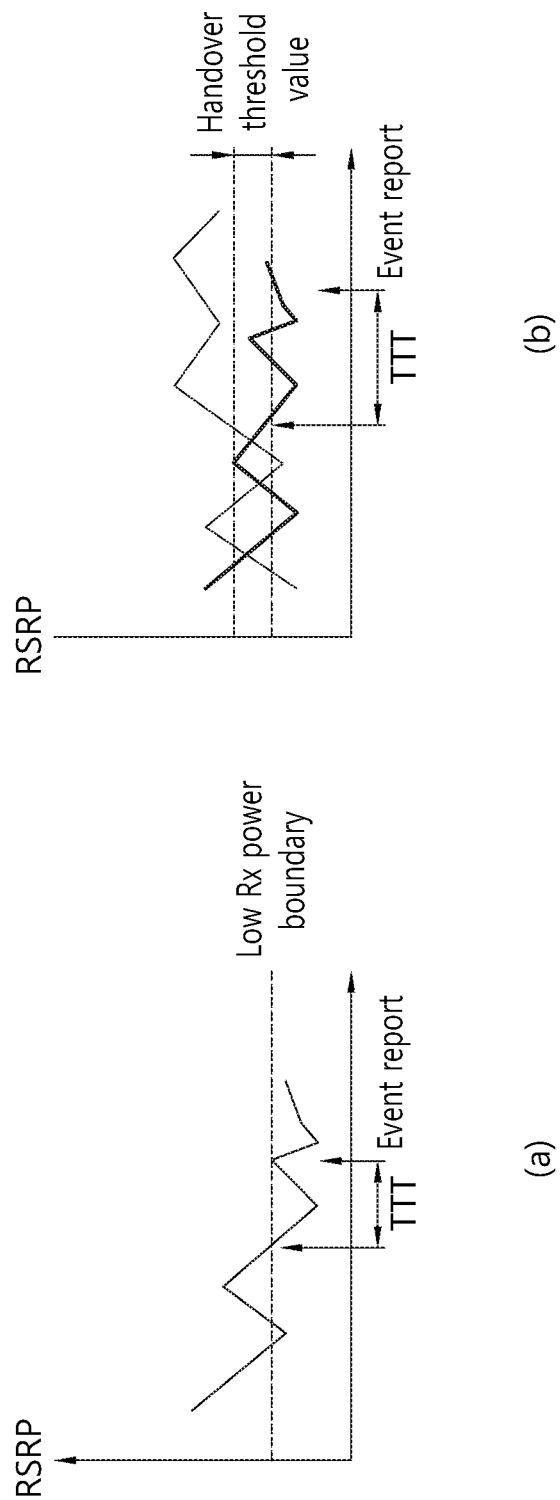
FIG. 3 illustrates one example of an existing radio resource monitoring (RRM) technique for selecting an eNB or a cell.

FIG. 3 illustrates one example of an existing radio resource monitoring (RRM) technique for selecting an eNB or a cell. In order for a terminal to request a currently connected eNB to change the current eNB or cell, an event, which notifies of a possible need for change of an eNB or a cell, has to be triggered. FIG. 3(a) shows one example of an event trigger according to the reduction of reception power of a serving cell. In other words, an event may be triggered when the reception power of an RS received from a serving cell is reduced below a threshold value (a low Rx power threshold) to generate a need to change a connection point to another eNB or cell. FIG. 3(b) illustrates one example of an event trigger due to a search for a more appropriate cell. In other words, an event may be triggered when the reception power of an RS received from a different cell rather than the serving cell is higher than the reception power of an RS received from the serving cell for a predetermined time period, and it is determined that there exists an eNB or a cell more appropriate as a connection point than the current serving cell. Similarly, when the two situations occur simultaneously or sequentially, an event may be triggered. If an event is triggered, the network or the serving eNB may determine to request a terminal to measure and report channel status in more detail, or perform or command change of the serving cell, or maintain the current serving cell by taking into account a factor in terms of various network aspects such as traffic balance not noticed by the terminal.

Figure 4:
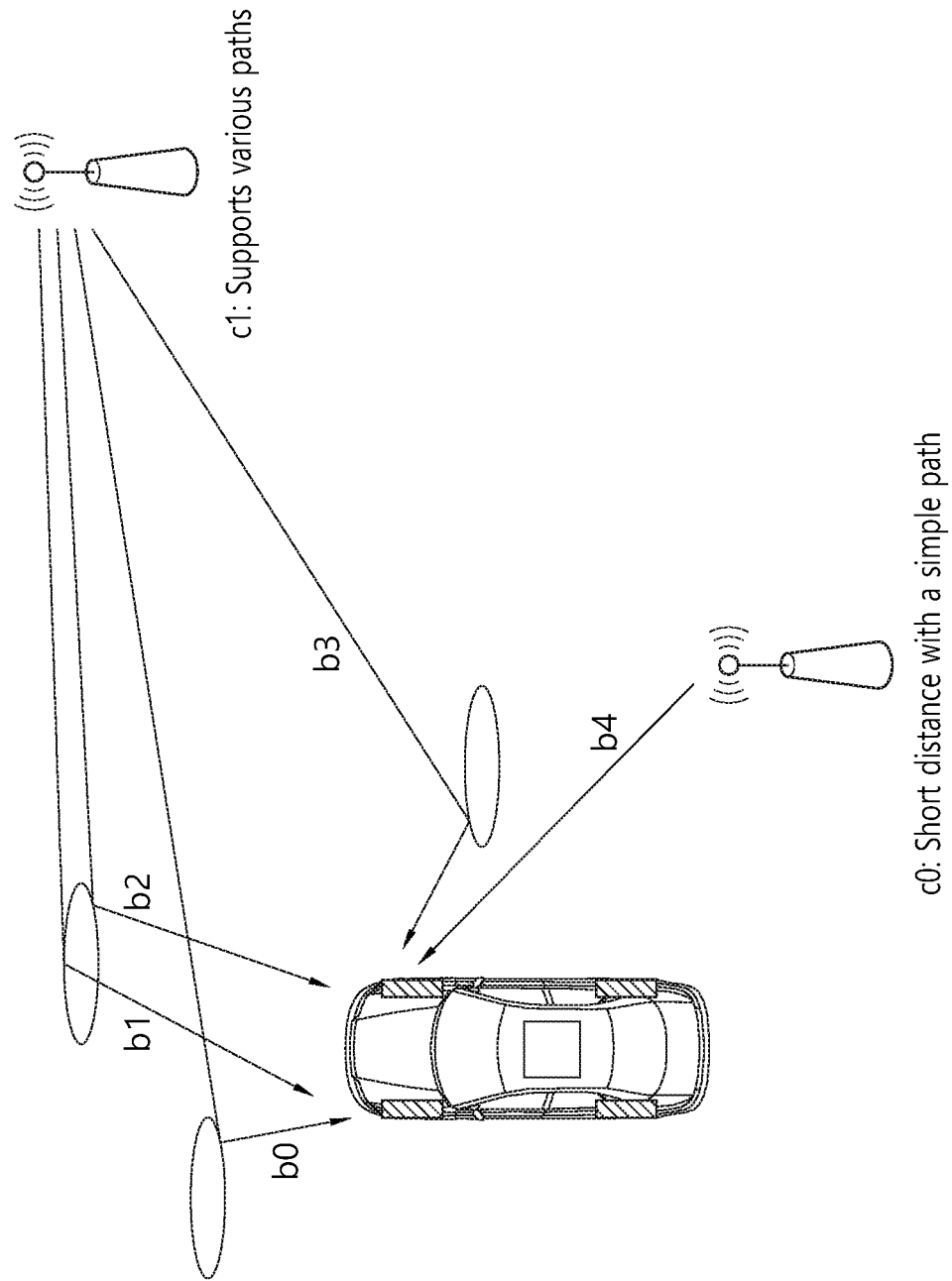
FIG. 4 illustrates one example of a problem in the existing reception power-based access control method with respect to a distributed antenna array.

FIG. 4 illustrates one example of a problem in the existing reception power-based access control method with respect to a distributed antenna array. Referring to FIG. 4, since the distance between the vehicle equipped with a distributed antenna array and the eNB c0 is short, the vehicle may receive an RS from the c0 with high reception power. However, since there is only one path between the vehicle and the c0, a probability of link failure becomes high in the presence of an obstacle blocking the path. On the other hand, the distance between the vehicle equipped with a distributed antenna array and the eNB c1 is relatively long. Therefore, it is inevitable that the vehicle measures an RS from the c1 with relatively low reception power. However, since there are various other paths available between the vehicle and the c1, the c1 may provide communication to the vehicle through various paths, and a connection is secured even in the presence of an obstacle between the vehicle and the c1. However, according to the existing reception power-based access control method, c0 is always selected, which provides high reception power of an RS. Therefore, in order for a distributed antenna array to obtain an actual gain from the current mobile communication system, cell selection which takes into account path distribution information needs to be considered.

In order for a transmitting end (for example, an eNB) to generate a beam suitable for reception, the transmitting end has to figure out channel information, generate a suitable beam, and accurately measure the gain obtained from the use of the beam. The channel information may be measured in such a way that a receiving end (for example, a terminal) transmits a separate RS or pilot signal to the transmitting end, which is subsequently measured by the transmitting end. However, in the current mobile communication system, the receiving end measures a channel and report the measurement to the transmitting end in the form of channel station information (CSI). CSI may be reported to the eNB by using either an explicit CSI reporting method or an implicit CSI reporting method. In the explicit CSI reporting method, the receiving end does not interpret a measured channel but report information as close as possible to the measured value to the transmitting end. To reduce signaling overhead due to CSI reporting, a MIMO channel expressed in the form of a matrix may be quantized, or singular vector decomposition (SVD) operation may be performed. In the implicit CSI reporting method, the receiving end does not transmit measured channel information directly to the eNB but interprets the channel information and reports only the information actually needed for the transmitting end to generate a beam. The implicit CSI reporting method requires smaller signaling overhead than the explicit CSI reporting method and is therefore employed by the current mobile communication system.

If a distributed antenna array is installed in a vehicle, the number of ranks is increased (high-rank). Therefore, to support a distributed antenna array in an efficient manner, a method for control each transmission beam in a precise manner has to be supported to transmit a plurality of beam simultaneously. However, the current mobile communication system supports a method for precisely controlling only the transmission beam based on a small number of ranks (low-rank beam). To control high-rank based transmission beams precisely, measurement and generation of various types of transmission beams has to be supported first. In the current mobile communication system standard, the number of precoders with a rank number of 8 is predefined as 1, and the number of precoders with a rank number of 2 is predefined as 16. Also, even if transmission of part of codeword or transport block (TB) fails or part of a link is disconnected due to rapid change of a channel when a plurality of codewords (or TBs) are transmitted simultaneously, the data rate for the user has to be ensured. To this purpose, a new codebook needs to be defined, and to increase the number of codewords or TBs that may be transmitted simultaneously, the overall structure of a DL MIMO transmitting end defined in the current mobile communication system has to be changed. However, if the structure of a codebook used for CSI measurement and report is changed, the amount of resources used for CSI reporting is increased, which in turn increases feedback overhead of other terminals not requiring high-rank reception and reduces the overall spectral efficiency. Similarly, the number of terminals capable of connecting to the network simultaneously is reduced due to a shortage of capacity of an uplink control channel, thereby leading to degradation of system performance.

To solve the problem above, a virtual terminal may be specified according to one embodiment of the present invention. DUs constituting a distributed antenna array installed in a vehicle are physically separated and may be designed to have different radiation patterns depending on their installation positions due to the nature of a vehicle the surface of which is metal. Also, compared with a channel generated between an eNB and each reception antenna in an ordinary linear array structure, the channel formed between the eNB and each DU reveals low correlation and high independence due to reflection from and propagation over the metallic surface. By exploiting this property, each DU or part of the DU may be grouped and used to transmit and receive data as if used by an individual user independently from other DU. In other words, a DU constituting a distributed antenna array installed in one vehicle is reported to the network as if it is a separate terminal, through which the DU may be reported to part of entries of the network, and high-rank transmission and reception may be realized. The technique described above may be called a virtual terminal assignment technique in that each DU or part of the DU operates as if it is a virtual terminal. As a virtual terminal is assigned, problems in standardization and implementation of a distributed antenna array may be solved and at the same time, the following advantages specific to the distributed antenna array installed in a vehicle may be obtained.

(1) Integrated QoS management may be possible through one bearer without performing QoS management separately for each virtual terminal. A network entry except for a particular entry such as the eNB recognizes a vehicle including a plurality of virtual terminals as a single terminal.

(2) A MIMO channel is formed between the eNB and the vehicle, and the eNB may perform transmission control and feedback reception with respect to each virtual terminal. Therefore, there is no effect influencing other devices.

Figure 5:
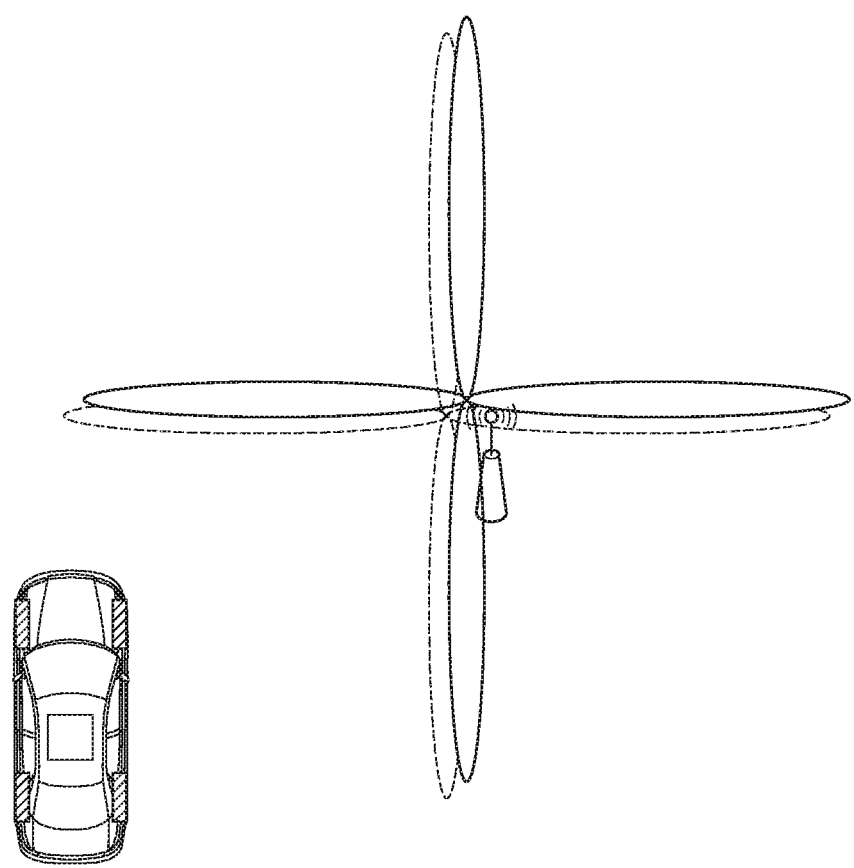
FIG. 5 illustrates precision of controlling a high-rank transmission beam when a virtual terminal is not specified.

FIG. 5 illustrates precision of controlling a high-rank transmission beam when a virtual terminal is not specified. Referring to FIG. 5, if a virtual terminal is not specified, a vehicle is recognized as a single terminal, and at this time, only eight transmission beams transmitted to four different directions are available. This is so because the current mobile communication system defines only one precoder the rank of which is 8.

Figure 6:
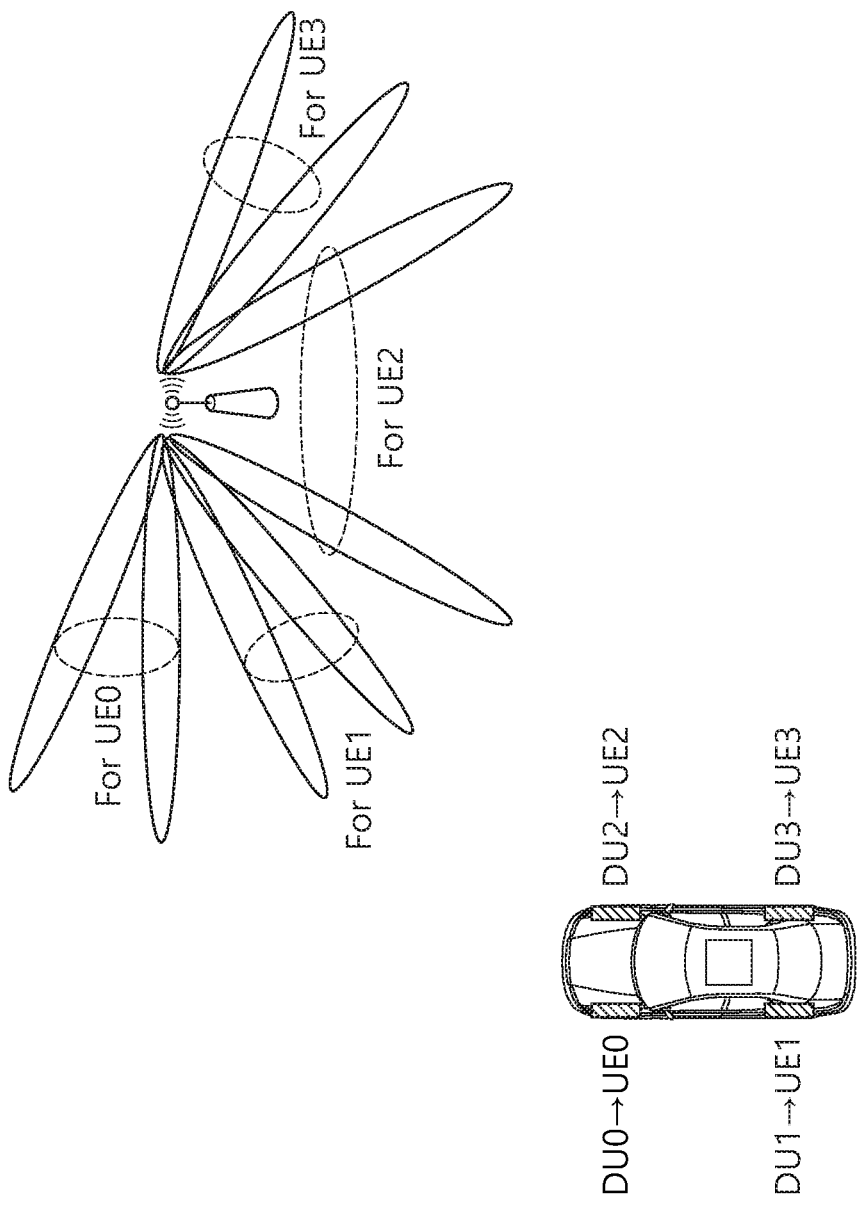
FIG. 6 illustrates precision of controlling a high-rank transmission beam when a virtual terminal is specified.

FIG. 6 illustrates precision of controlling a high-rank transmission beam when a virtual terminal is specified. Referring to FIG. 6, DU 0, DU 1, DU 2, and DU 3 are specified as a virtual terminal 0, virtual terminal 1, virtual terminal 2, and virtual terminal 3, respectively. The vehicle terminal may select one from a combination of 16 (=24) transmission beams for each virtual terminal and request the selected beam from the eNB. In other words, by introducing virtual terminals, CSI reporting and control of a transmission beam may be performed in a precise manner.

Table 1 illustrates one example of designating a plurality of virtual terminals to one vehicle terminal. Table 1 is an example in which one vehicle terminal forms a receiving end through four DUs.

TABLE 1

| UE ID | DU composition (Sub-array) | Remarks |
|---|---|---|
| ID 0 (RNTI #1) | All DUs | A basic ID recognized by all of entries of the network |
| ID 1 (RNTI #2) | DU 1 | Virtual terminal ID |
| ID 2 (RNTI #3) | DU 2 | Virtual terminal ID |
| ID 3 (RNTI #4) | DU 3/DU 4 | Virtual terminal ID |
| ID 4 (RNTI #5) | DU 1/DU 2 | Virtual terminal ID |

Referring to Table 1, UE ID 0 corresponds to the vehicle terminal including all of the DUs, which is a default ID that is recognized by all of the entries. One virtual terminal may include one DU. For example, UE ID 1 is a virtual terminal ID corresponding to DU 1, and UE ID 2 is a virtual terminal ID corresponding to DU 2. Also, a virtual terminal may be constructed by a combination of two or more DUs. For example, UE ID 3 is a virtual terminal ID corresponding to DU 3 and DU 4, and UE ID 4 is a virtual terminal ID corresponding to DU 1 and DU 2.

Each virtual terminal may be configured to have different physical channel characteristics through different DUs. Similarly, each virtual terminal may be configured to share part of DUs so that it becomes suitable for multiple access interference control caused by multi-user (MU)-MIMO access scheme. Likewise, each virtual terminal may be configured to have different reception performance and reception complexity by including a different number of DUs therein. Furthermore, a specific combination of DUs may be registered as a default UE. In the descriptions above, different DUs refer to receiving ends to which separate indicators (for example, physical channel ID, cell-specific UE ID (namely radio network temporary identity (RNTI), or a reception antenna indicator) are assigned. The separate indicator enables a receiving end which receives data from an eNB or part of entries of the network to recognize the data separately.

In what follows, a method for performing communication with a virtual terminal according to one embodiment of the present invention will be described. According to one embodiment of the present invention, when an actual terminal (for example, vehicle terminal) is registered or connected to the network such that the actual terminal includes a plurality of virtual terminals (for example, DUs), communication is performed between an eNB which directly manages terminals and the actual terminal by a connection through a plurality of virtual terminals, but communication between an upper network entry higher than the eNB level and the actual terminal may be performed by a connection through the actual terminal. The present invention proposes a method for performing registration of virtual terminals, a method for an eNB to perform communication with a UE through the virtual terminals, and UE functions based on the proposed methods. In what follows, an actual terminal refers to a terminal defined by one global UE ID or a terminal performing communication to support one service. And for the convenience of descriptions, the actual terminal may be regarded as a vehicle terminal.

Figure 7:
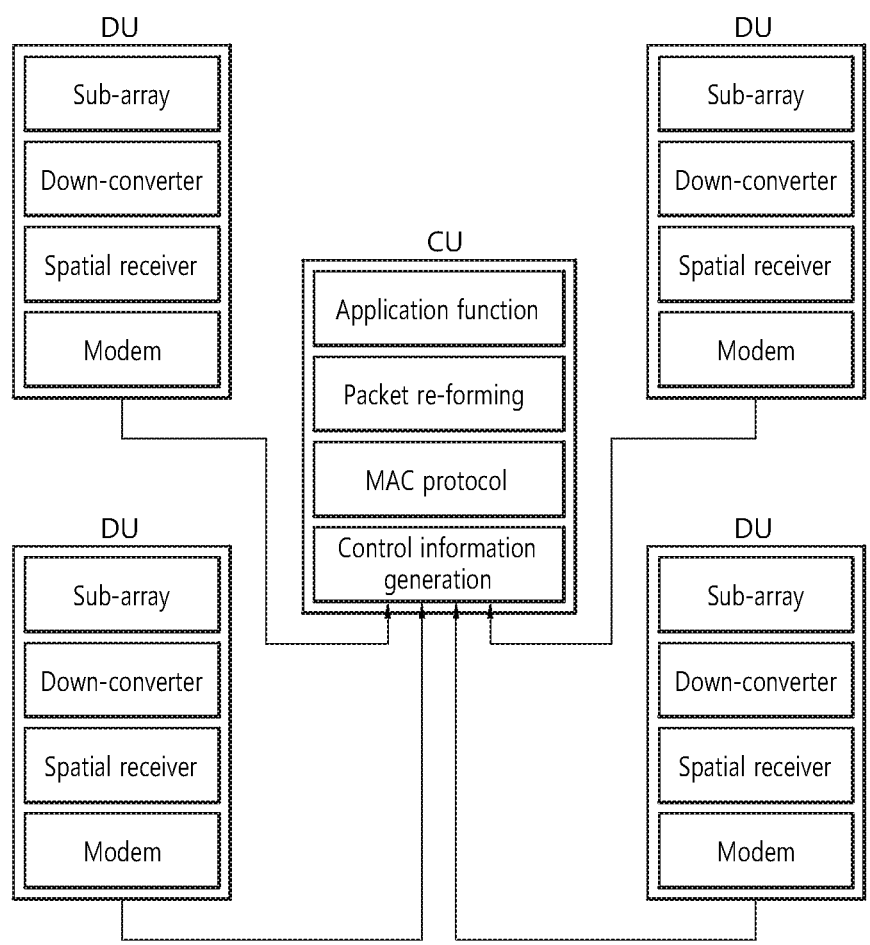
FIGS. 7 and 8 illustrate one example of an actual terminal supporting virtual terminals.
Figure 8:
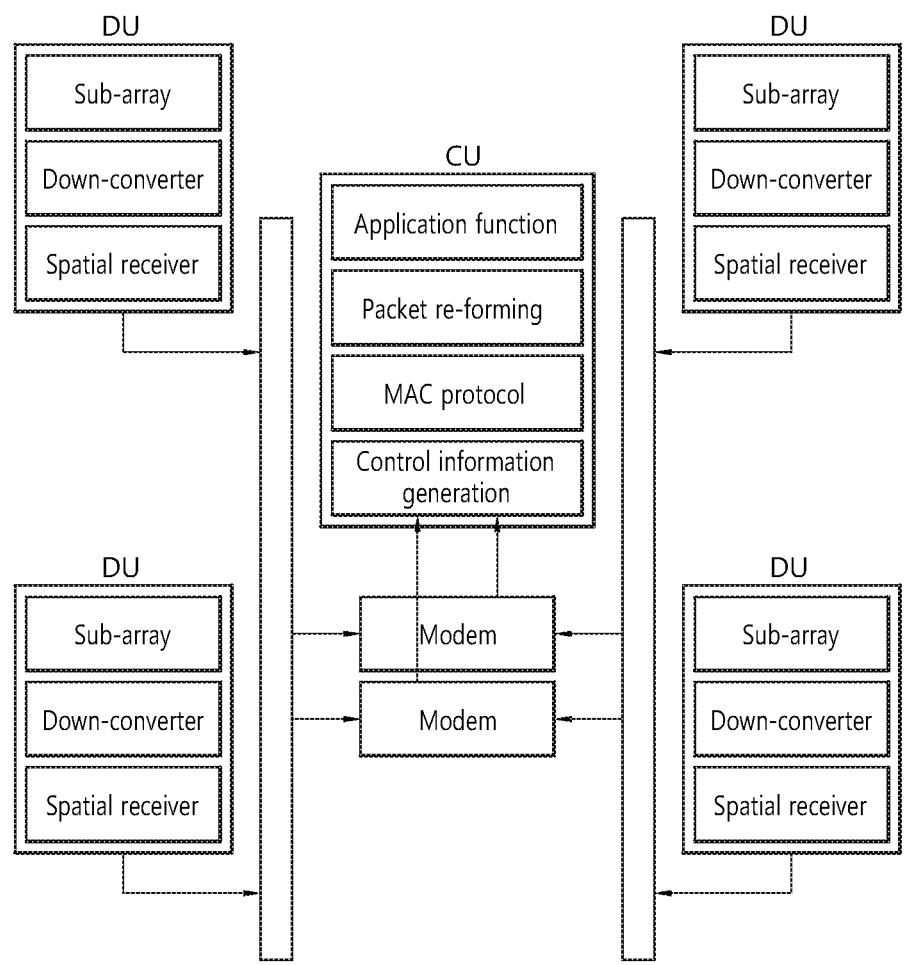

FIGS. 7 and 8 illustrate one example of an actual terminal supporting virtual terminals. Referring to FIGS. 7 and 8, an actual terminal consists of a CU which makes a final decision about content of control information to be delivered to an eNB and a reporting method, and DUs receiving downlink signals. A CU may perform functions such as application function, packet reforming, media access control (MAC) protocol, and control information generation. In other words, in addition to the function of generating control information, the CU may perform functions of an upper layer higher than the physical layer, including restoring a serving packet from the information received through each DU and performing an application. A DU may be composed of a sub-array, down-converter, and spatial receiver. One or more modems may be installed, which are used to restore a downlink signal received by each DU in the first-order. The connection between each DU and the modem may be fixed or changeable. FIG. 7 illustrates a case in which a modem is installed in each DU. In this case, each DU restores a received downlink signal in the first-order and transmits the restored signal to the CU. FIG. 8 illustrates a case in which a modem is not installed within each DU but installed as a separate unit. At this time, each DU transmits a received downlink signal to a separately installed modem. The modem then restores the downlink signal and transmits the restored signal to the CU.

Figure 9:
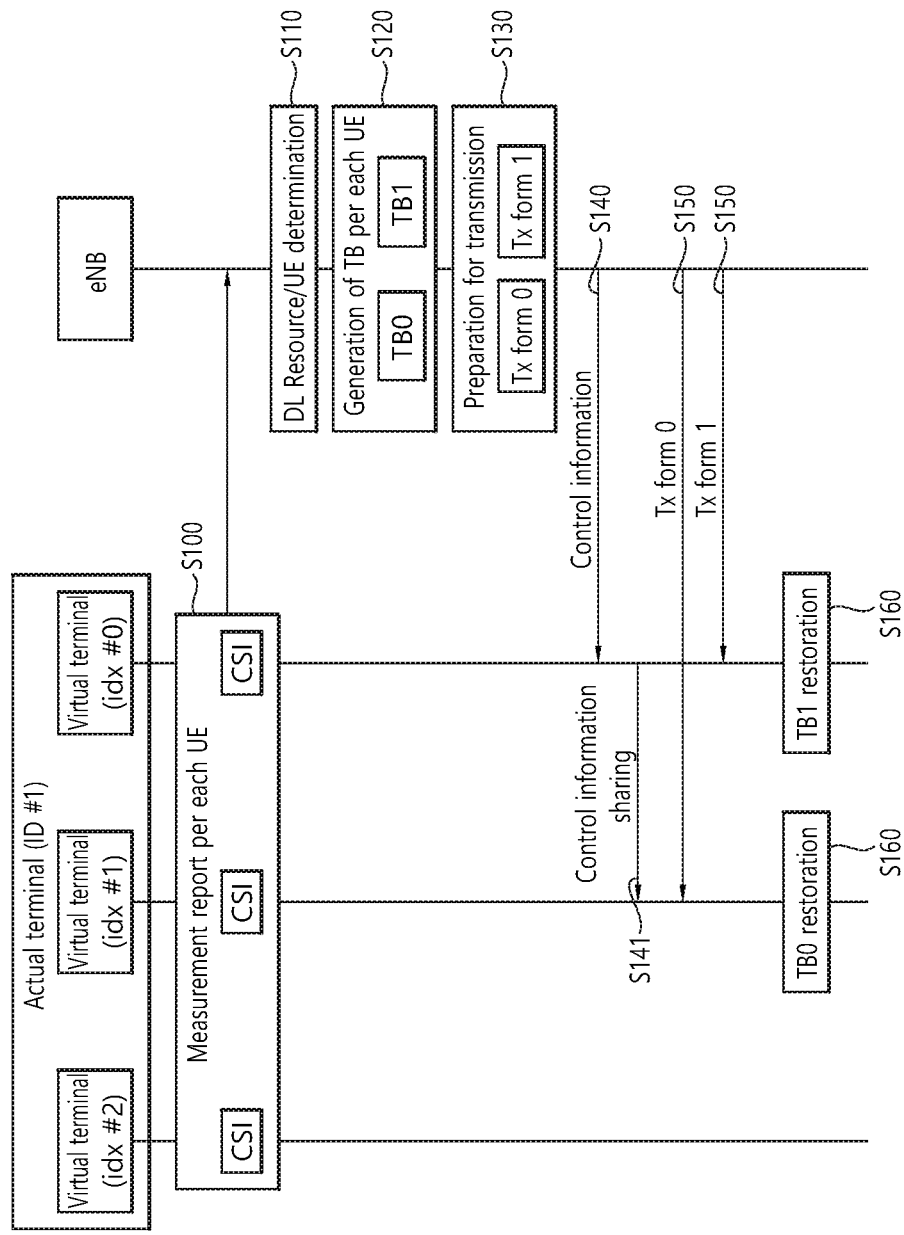
FIG. 9 illustrates a method for performing communication with a virtual terminal according to one embodiment of the present invention.

FIG. 9 illustrates a method for performing communication with a virtual terminal according to one embodiment of the present invention. When transmitting data to an actual terminal including a plurality of virtual terminals, the eNB may dynamically determine the virtual terminal supposed to receive the data. When a plurality of virtual terminals are assigned to one actual terminal according to one embodiment of the present invention, it is not necessary to assign an independent ID to each virtual terminal. Therefore, the eNB is able to recognize a plurality of virtual terminals as component terminals attached to one actual terminal. Therefore, the eNB may perform radio link control for the actual terminal and at the same time, may dynamically perform transmission control, and transmission and reception switching for a plurality of virtual terminals depending on the needs. FIG. 9 assumes a situation in which three virtual terminals (idx #0, idx #1, and idx #2) are assigned to one actual terminal (ID #1).

In step S100, each virtual terminal measures a channel and reports the measurement to the eNB in the form of CSI. In step S110, taking into account the CSI reported by each virtual terminal, the eNB may determine that transmitting downlink data to only two (for example, idx #0 and idx #1) out of the three virtual terminals is desirable. Accordingly, in step S120, the eNB generates TB for each virtual terminal for transmission of downlink data. At this time, it is assumed that the TB to be transmitted to the virtual terminal idx #0 is TB0, and the TB to be transmitted to the virtual terminal idx #1 is TB1. In step S130, the eNB prepares transmission with respect to Tx form 0 corresponding to TB0 and Tx form 1 corresponding to TB1.

In step S140, before transmitting downlink data to a plurality of virtual terminals, the eNB may transmit control information required for transmission of downlink data to at least one of virtual terminals. At this time, control information may be transmitted to each virtual terminal supposed to receive the downlink data or integrated control information may be transmitted to one representative virtual terminal representing a plurality of virtual terminals supposed to receive the downlink data. In other words, virtual terminals receiving downlink data and virtual terminals receiving control information required for transmission of downlink data may be set differently.

FIG. 9 illustrates a situation in which the eNB transmits control information to the virtual terminal idx #0 representing the virtual terminal idx #0 and idx #1. In other words, the virtual terminal idx #0 is designated to operate as a representative virtual terminal between the eNB and the actual terminal, and before transmitting TB0 and TB1 to the virtual terminal idx #0 and idx #1 respectively, the eNB transmits, to the representative virtual terminal idx #0, control information required for each virtual terminal to receive downlink data. In step S141, the virtual terminal idx #0 shares the received control information by transmitting the receiving control information to the virtual terminal idx #1. Composition of control information will be described in detail later.

In step S150, the eNB transmits downlink data to each virtual terminal. In other words, the eNB may transmit Tx form 0 to the virtual terminal idx #0 and Tx form 1 to the virtual terminal idx #1. In step S160, each virtual terminal restores downlink data transmitted from the eNB. In other words, the virtual terminal idx #0 may restore TB0, and the virtual terminal idx #1 may restore TB1.

Composition of control information required for an eNB to transmit downlink data to a plurality of virtual terminals will be described in more detail. The control information required to transmit downlink data to a plurality of virtual terminals may be composed within one downlink control information (DCI) in an integrated manner. The control information composed in an integrated manner within one DCI may be transmitted to a representative virtual terminal among a plurality of virtual terminals. The corresponding representative virtual terminal may interpret received control information and transmit the content of the interpreted received control information to the remaining virtual terminals. Similarly, the control information required to transmit downlink data to a plurality of virtual terminals may be composed by the DCI of each virtual terminal. The DCI of each virtual terminal may also be transmitted to the representative virtual terminal among the plurality of virtual terminals. When the control information is transmitted to the representative virtual terminal among the plurality of virtual terminals, an index of a virtual terminal which may be understood only by the eNB and the actual terminal may be assigned, and the index of a virtual terminal which receives downlink data at the time of transmitting control information may also be transmitted together.

Figure 10:
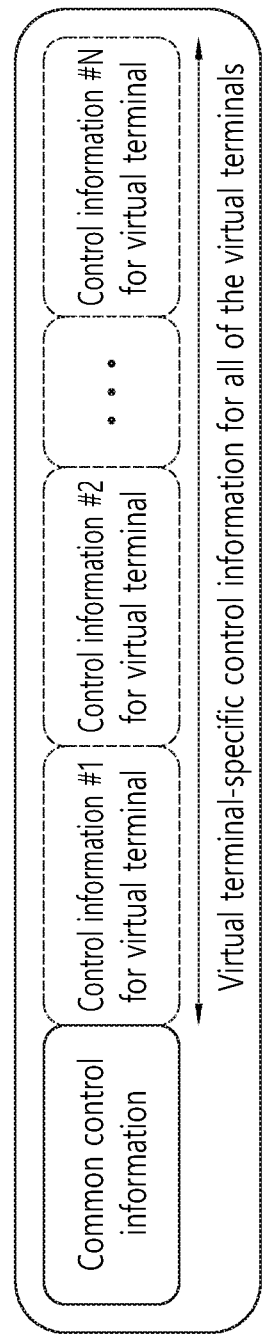
FIG. 10 illustrates one example of control information for downlink data to be transmitted to a plurality of virtual terminals according to one embodiment of the present invention.

FIG. 10 illustrates one example of control information for downlink data to be transmitted to a plurality of virtual terminals according to one embodiment of the present invention. FIG. 10 illustrates a situation in which control information for downlink data to be transmitted to a plurality of virtual terminals is composed within one DCI having a fixed length. Referring to FIG. 10, an integrated DCI having a fixed length may include common control information and control information for each virtual terminal. Control information for each virtual terminal includes control information common for all of the virtual terminals. In other words, irrespective of whether actual downlink data is transmitted, the integrated DCI having a fixed length includes information about all of the virtual terminals. Accordingly, the length of the integrated DCI is fixed. DCI is defined by first securing payload for control information with respect to all of the virtual terminals, and the control information about virtual terminals to which downlink data is not actually transmitted may be set to null.

Figure 11:
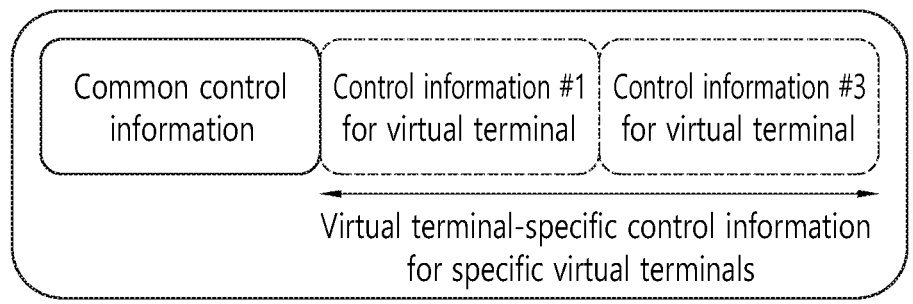
FIG. 11 illustrates another example of control information for downlink data to be transmitted to a plurality of virtual terminals according to one embodiment of the present invention.

FIG. 11 illustrates another example of control information for downlink data to be transmitted to a plurality of virtual terminals according to one embodiment of the present invention. FIG. 11 illustrates a situation in which control information for downlink data to be transmitted to a plurality of virtual terminals is composed within one DCI having an adaptive length (namely a variable length). Referring to FIG. 11, the integrated DCI having an adaptive length includes common control information and control information for each virtual terminal. The control information for each virtual terminal includes control information of a virtual terminal actually receiving downlink data. In other words, according to whether a virtual terminal actually receives downlink data, the integrated DCI having an adaptive length includes only the control information about part of the virtual terminals. Accordingly, the length of the integrated DCI is variable. In other words, the integrated DCI includes as many resources as required to transmit control information about virtual terminals selected to actually receive downlink data. Therefore, the length of the integrated DCI varies adaptively according to the number of virtual terminals selected to actually receive downlink data, and compared with the integrated DCI having a fixed length, described with reference to FIG. 10, payload may be reduced.

In the integrated DCI described above, control information about each virtual terminal may be composed incrementally. For example, in the integrated DCI having a fixed length described with reference to FIG. 10, control information about the virtual terminal #2 does not include all of the control information about the virtual terminal #2 but may include only the difference value from the control information about the virtual terminal #1. As another example, when the size of modulation and coding scheme (MCS) with respect to the virtual terminal #1 is 5 bit, the MCS sizes for the remaining virtual terminals may be expressed by using only 1 to 4 bits of difference value with respect to the MCS size of the virtual terminal #1 rather than using the 5 bits. Therefore, the overall length of the integrated DCI may be reduced.

Meanwhile, in the embodiments of FIGS. 10 and 11, control information for the virtual terminal #1 to the virtual terminal # N is allocated sequentially within an integrated DCI. However, the present invention is not limited to the specific embodiments, and the order of allocating control information about a plurality of virtual terminals may be determined freely. The order of allocating control information about a plurality of virtual terminals within an integrated DCI and/or resource allocation field may be set by the eNB through an upper layer signal (for example, radio resource control (RRC) signal) or DCI, or determined by a value predetermined between the eNB and the UE.

Also, the integrated DCI described above may be masked with CRC as a unique identifier (for example, group RNTI (G-RNTI)) of a virtual terminal group or a unique identifier of a representative virtual terminal. Also, control information for each virtual terminal may include at least one of MCS, hybrid automatic repeat request (HARQ), transmit power control (TPC), new data indicator (NDI), redundancy version (RV), or transmission precoder information.

Figure 12:
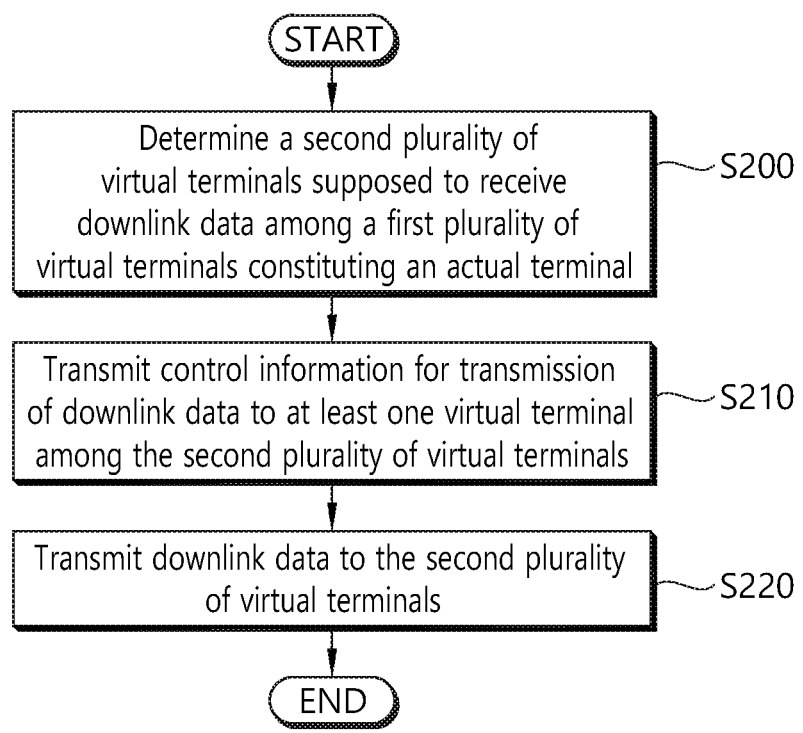
FIG. 12 illustrates a method for performing communication with a virtual terminal according to another embodiment of the present invention.

FIG. 12 illustrates a method for performing communication with a virtual terminal according to another embodiment of the present invention. The present invention described above may be applied to the embodiment of FIG. 12.

In step S200, among a first plurality of virtual terminals constituting an actual terminal, the eNB determines a second plurality of virtual terminals supposed to receive downlink data. The actual terminal is one vehicle terminal, and each of the first plurality of virtual terminals may include at least one of a plurality of distributed antenna arrays installed in the vehicle terminal. The actual terminal may correspond to one global UE ID or a UE performing communication for supporting one service. Also, the actual terminal may include a CU controlling the first plurality of virtual terminals.

In step S210, the eNB transmits control information for transmission of the downlink data to at least one virtual terminal among the second plurality of virtual terminals. The control information transmitted to the representative virtual terminal may be delivered to the remaining virtual terminals among the second plurality of virtual terminals by the representative virtual terminal. Similarly, the control information may be transmitted to the second plurality of virtual terminals. Together with the control information, virtual terminal indexes assigned to the second plurality of virtual terminals may be transmitted.

The control information may be one DCI including common control information and control information for each virtual terminal. The control information for each virtual terminal includes control information about all of the virtual terminals belonging to the first plurality of virtual terminals, and the length of one DCI may be fixed. This composition corresponds to the embodiment of FIG. 10. Similarly, control information for each virtual terminal includes only the control information for a virtual terminal belonging to the second plurality of virtual terminals, and the length of one DCI may be adaptively determined. This composition corresponds to the embodiment of FIG. 11. The control information for each virtual terminal may be expressed in terms of a difference value of the control information with respect to a specific virtual terminal. Also, the control information for each virtual terminal may include at least one of MCS, HARQ, TPC, NDI, RV, or transmission precoder information. The control information may correspond to the DCI for each virtual terminal.

In step S220, the eNB transmits the downlink data to the second plurality of virtual terminals.

As a method for more easily implementing high-rank transmission beam control which is highly required to secure high data rate and link reliability at the same time for vehicle communication, the present invention defines a plurality of virtual terminals in one UE and provides a method for an eNB to manage a plurality of virtual terminals in an integrated manner and to perform transmission and reception to and from the plurality of virtual terminals. By allocating a plurality of virtual terminals to an actual terminal, the present invention may ensure increase of rank, increase of the number of codewords that may be received simultaneously, and increase of degree of freedom in scheduling such as resource allocation, and ensure performance of novel UEs such as vehicle terminals requiring high performance. Also, without influencing existing mobile communication systems and the structure of the current network supporting conventional UEs, the present invention supports a vehicle terminal to perform high-rank reception by allocating virtual terminals.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by an eNodeB (eNB) in a wireless communication system, the method comprising:
   receiving information on channel state of a plurality of virtual terminals constituting an actual terminal;
   determining a group of virtual terminals to which downlink data is to be transmitted, among the plurality of virtual terminals, based on the information on the channel state of the plurality of virtual terminals;
   transmitting control information for transmission of the downlink data to a representative virtual terminal, wherein the control information includes indexes of the determined group of virtual terminals; and
   transmitting the downlink data to the group of virtual terminals,
   wherein the control information is transferred to the group of virtual terminals by the representative virtual terminal based on the indexes included in the control information, and
   wherein the plurality of virtual terminals are configured with one bearer.

2. The method of claim 1, wherein the control information is downlink control information (DCI) including common control information.

3. The method of claim 2, wherein the DCI further includes control information about all of the plurality of virtual terminals, and
   wherein a length of the DCI is fixed.

4. The method of claim 2, wherein the DCI further includes only control information about virtual terminals belonging to the group of virtual terminals among the plurality of virtual terminals, and wherein a length of the DCI is adaptive.

5. The method of claim 2, wherein the DCI further includes at least one of a modulation and coding scheme (MCS), a hybrid automatic repeat request (HARD), a transmit power command (TPC), a new data indicator (NDI), a redundancy version (RV), or transmission precoder information.

6. The method of claim 1, wherein the actual terminal is a vehicle terminal, and wherein each of the plurality of virtual terminals includes at least one of a plurality of distributed antenna arrays installed in the vehicle terminal.

7. The method of claim 1, wherein the actual terminal is related to one global UE identity (ID) or a user equipment (UE) performing communication to support one service.

8. The method of claim 1, wherein the actual terminal includes a central unit (CU) controlling the plurality of virtual terminals.

9. An eNodeB (eNB) in a wireless communication system, the eNB comprising:

a transceiver; and a processor, connected to the transceiver, that:

controls the transceiver to receive information on channel state of a plurality of virtual terminals constituting an actual terminal;

determines a group of virtual terminals to which downlink data is to be transmitted, among the plurality of virtual terminals, based on the information on the channel state of the plurality of virtual terminals, controls the transceiver to transmit control information for transmission of the downlink data to a representative virtual terminal, wherein the control information includes indexes of the determined group of virtual terminals, and controls the transceiver to transmit the downlink data to the group of virtual terminals, wherein the control information is transferred to the group of virtual terminals by the representative virtual terminal based on the indexes included in the control information, and wherein the plurality of virtual terminals are configured with one bearer.

10. The method of claim 1, wherein the plurality of virtual terminals provide same quality of service (QoS).

* * * * *